United States Patent [19]

Sasakura et al.

[11] Patent Number: 4,780,860

[45] Date of Patent: Oct. 25, 1988

[54] BEAM FORMING DEVICE

[75] Inventors: Toyoki Sasakura, Ashiya; Yasuhiko Endo, Nishi, both of Japan

[73] Assignee: Furuno Electric Company, Limited, Nishinomiya, Japan

[21] Appl. No.: 826,413

[22] Filed: Feb. 5, 1986

[30] Foreign Application Priority Data

| | | | |
|---|---|---|---|
| Feb. 8, 1985 | [JP] | Japan | 60-24036 |
| Feb. 14, 1985 | [JP] | Japan | 60-26834 |
| Mar. 27, 1985 | [JP] | Japan | 60-63049 |
| Mar. 27, 1985 | [JP] | Japan | 60-63050 |
| Apr. 19, 1985 | [JP] | Japan | 60-85041 |
| May 29, 1985 | [JP] | Japan | 60-116131 |
| May 29, 1985 | [JP] | Japan | 60-116132 |

[51] Int. Cl.⁴ ....................... H04B 17/00; H04R 17/00

[52] U.S. Cl. ....................................... 367/138; 367/12; 367/103; 367/905; 367/164

[58] Field of Search ............... 367/103, 105, 119, 138, 367/164, 905, 912, 12; 342/368, 371; 73/625, 626

[56] References Cited

U.S. PATENT DOCUMENTS

| | | | |
|---|---|---|---|
| 2,875,355 | 2/1959 | Petermann | 367/103 |
| 2,967,957 | 1/1961 | Massa | 367/164 |
| 3,899,666 | 8/1975 | Bolger | 364/821 |
| 3,918,024 | 11/1975 | Macovski | 367/103 |
| 4,271,490 | 6/1981 | Minohara et al. | 367/122 |
| 4,380,808 | 4/1983 | Hill et al. | 367/103 |
| 4,423,494 | 12/1983 | Groves et al. | 367/103 |
| 4,596,007 | 6/1986 | Grall et al. | 367/105 |

*Primary Examiner*—Thomas H. Tarcza
*Assistant Examiner*—Daniel T. Pihulic
*Attorney, Agent, or Firm*—Jordan and Hamburg

[57] ABSTRACT

The present invention relates to a beam forming device for forming a uniform radiation beam and/or a reception beam. In radiation, the transducer is vibrated in such a way that the pressure of a sound wave produced from each point of the vibrating surface of the transducer is determined based on a weight function, thereby forming a radiation beam. In reception, electric signals are derived based on the sound energy received in a manner that the amplitude level of an electric signal produced based on the sound energy received by each point of the vibrating surface of the transducer is determined based on a weight function, and the derived signals are combined with one another to form a reception beam.

60 Claims, 6 Drawing Sheets

BEAM FORMING DEVICE

BACKGROUND OF THE INVENTION

The present invention relates to a beam forming device for forming a uniform radiation beam and/or a uniform reception beam. The device is capable of radiating a search signal in a manner that the energy amount of the radiated signal is substantially the same at the same distance from the device within an angular range. The device is also capable of receiving incoming signals in such a way that electrical signals of the same amplitude level are produced based on signals of the same energy measured at a distance from the device, coming within an angular range.

The invention can be embodied in a beam forming device used in an underwater detection system for radiating or receiving ultrasonic wave signals, or in a radar apparatus for emitting or receiving electromagnetic waves.

Hereinafter, the invention will be explained as embodied in a beam forming device for radiating and/or receiving ultrasonic wave signals.

A prior art beam forming device comprises a transducer having electrodes. The device supplies the entire area of the electrode of the transducer with a signal having a constant amplitude level to radiate a resultant search signal, or receives incoming signals with the transducer. The directional characteristics of a radiation beam or a reception beam formed by the prior art device are shown in FIG. 27 wherein the vertical axis represents a radiation response level measured at the same distance from the device, or a reception response level measured at the receiving unit, and the horizontal axis represents an azimuthal angle. In radiation, FIG. 27 indicates that the signal strength of a radiated search signal in one direction is not the same as the one in another direction within an angular range. In reception, FIG. 27 shows that the amplitude of an electrical signal produced based on an ultrasonic signal of an energy level measured at a distance from the device coming in one direction is not the same as the one of another ultrasonic signal of the same energy level measured at the same distance, coming in another direction within an angular range.

With an underwater detection system employing the prior art beam forming device having the directional characteristics shown in FIG. 27, the incoming signals received thereby are displayed on the indicator unclearly and vaguely in their boundaries. Another drawback is that the size of a displayed image is enlarged or reduced when the amplification gain of the receiver for amplifying incoming signals is varied. This makes it difficult to exactly ascertain the size of the object being searched.

SUMMARY OF THE INVENTION

Accordingly, an object of the present invention is to provide a beam forming device for forming a uniform radiation beam.

Another object of the invention is to provide a beam forming device for forming a uniform reception beam.

Another object of the invention is to provide a beam forming device for forming a uniform radiation beam, used in an underwater detection system.

Another object of the invention is to provide a beam forming device for forming a uniform reception beam, incorporated in an underwater detection system.

Another object of the invention is to provide a beam forming device for forming a radiation beam and a reception beam, embodied in an underwater detection system.

Another object of the invention is to provide a beam forming device for selectively forming one of a plurality of types of radiation or reception beams with different beam widths.

Another further object of the invention is to provide a beam forming device for forming a uniform radiation beam or a reception beam in a desired direction.

According to one aspect of the invention, the beam forming device comprises (i) a transducer having electrodes for converting electric energy into sound energy, (ii) the vibrating surface of the transducer, and (iii) signal providing means for providing the electrodes with an electric signal so that sound waves are produced from the vibrating surface in a manner that the pressure of a sound wave produced from each point of the surface is determined based on a weight function, thereby forming a uniform radiation beam.

According to another aspect of the invention, the beam forming device comprises (i) a transducer having electrodes for receiving sound energy and converting it into electric energy, (ii) the vibrating surface of the transducer, (iii) signal producing means for generating electric signals based on the received sound energy in a manner that the amplitude level of an electric signal derived from the sound energy received by each point of the vibrating surface is determined based on a weight function, and (iv) means for combining the electric signals with one another so that a uniform reception beam is formed.

According to another aspect of the invention, the beam forming device comprises (i) a radiator for converting first energy into second energy, (ii) the radiating surface of the radiator and (iii) energy supply means for furnishing the first energy to said radiator so that the second energy is radiated from the radiating surface in a manner that the amount of the second energy produced from each point of the surface is determined based on a weight function, thereby forming a uniform radiation beam.

BRIEF DESCRIPTION OF THE DRAWINGS

In the drawings:

FIG. 2 shows the relationship between the signals applied to a transducer or signals derived based on the signals therefrom and the directional characteristics obtained by a beam forming device;

FIG. 3 shows a circuit diagram of a beam forming device according to an embodiment of the present invention;

FIG. 13 shows the relationship between the signals applied to a transducer or the signals produced based on the signals therefrom and the directional characteristics obtained by a beam forming device;

FIG. 14 shows a circuit diagram of a beam forming device according to an embodiment of the invention;

DETAILED DESCRIPTION OF THE PREFERRED EMBODIMENTS

Figure 1A:
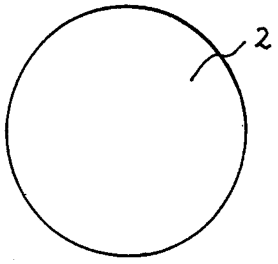
FIG. 1 shows a circular electrostrictive transducer used in a beam forming device according to an embodiment of the present invention, for explaining the principle of the invention.
Figure 1B:
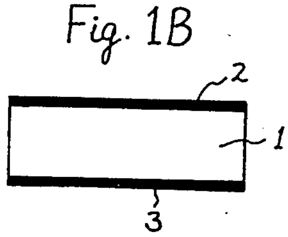
Figure 2A:
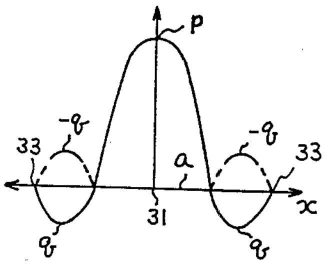
FIG. 2(A) shows a curve representing the amplitude levels of the signals emitted from the transducer or the amplitude levels of the signals derived based on the signals from the electrodes thereof.
Figure 2B:
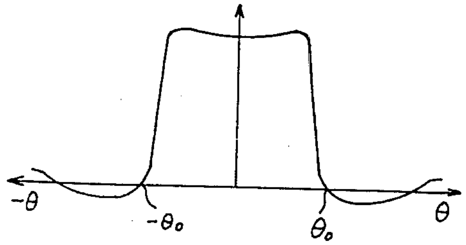
FIG. 2(B) shows the directional radiation or reception characteristics obtained by a beam forming device according to an embodiment of the invention.

Referring to FIG. 1, a circular electrostrictive transducer 1 has an upper electrode 2 and a lower electrode 3 fixed to the upper and lower sides of the transducer respectively. Referring to FIG. 2(A), a curve is drawn in accordance with the Bessel function $y=2J_1(x)/x$. In radiation, the curve represents the strength of vibration at one of the corresponding points of the transducer 1. Here, x is the distance between the center of the transducer and an imaginary circle thereon, and is expressed as $x=2\pi(l/\lambda)\theta$; l is the radius of an imaginary circle thereon, the points on which are vibrated at "zero" strength; λ is the wavelength of a carrier for carrying signals which are applied to the electrode to cause the vibrations; and θ is an azimuthal angle. One point 31 corresponds to the center of the transducer 1 and the other point 33 corresponds to the circumference thereof. Thus, the center of the transducer 1 is vibrated at the strength represented as "p", and the points on the circumference thereof are vibrated at "zero" strength. The points between the center of the transducer 1 and the circumference thereof are vibrated at the strength determined by the equation $y=2J_1(x)/x$ as shown in FIG. 2(A). As a result, a directional radiation response is obtained as shown in FIG. 2(B). The directional response is the same at the same distance from the transducer 1 within an angular range from "$-\theta_0$" to "$\theta_0$". Thus, a uniform radiation beam is formed.

The strength of vibration at each of the points of the transducer is in direct proportion to the amplitude of signals applied to respective points of the upper electrode 2 of the transducer 1. The signals result from, for example, a signal carried by a carrier with a carrier frequency of, for example, 50 kHz. This time, the curve shown in FIG. 2(A) represents the amplitude of signals applied to the respective points of the upper electrode 2. The center of the electrode 2 is supplied with the signal having an amplitude level "p", and the points on the circumference thereof are supplied with the signals of zero amplitude. The points between the center of the electrode 2 and the circumference thereof are supplied with the respective signals determined by the equation $y=2J_1(x)/x$. The lower electrode 3 is supplied with a signal of zero amplitude. As a result, a uniform radiation beam is formed, as shown in FIG. 2(B).

In reception, the curve shown in FIG. 2(A) represents the amplitude of incoming signals received by and derived from corresponding points of the transducer 1. Signals of respective various amplitude levels are derived from the corresponding points of the transducer 1 and combined to form a uniform reception beam, the directional characteristics of which are shown in FIG. 2(B). The signals are carried by a carrier having a carrier frequency of 50 kHz. A signal having an amplitude "p" is derived from the center of the transducer, and signals of zero amplitude are derived from the points on the circumference thereof. From the points between the center of the transducer and the circumference thereof are derived the signals of respective various amplitude levels determined by the equation $y=2J_1(x)/x$. The signals derived from the points of the transducer are combined to form a uniform reception beam as shown in FIG. 2(B).

Figure 3A:
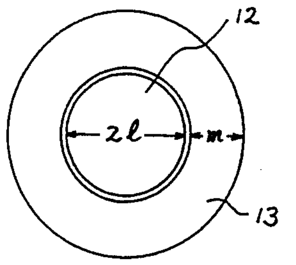
FIG. 3(A) shows the top view of the transducer used.
Figure 3B:
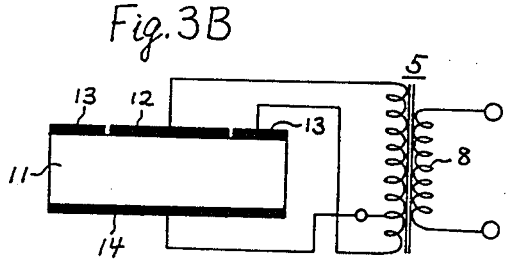
FIG. 3(B) shows the sectional view of the transducer and a related circuit diagram.

Referring to FIG. 3, the electrode on the upper side of a circular electrostrictive transducer 11 is circularly divided into two portions in such a way that the diameter of the inner portion 12 of the electrode is 2 l and the width of the outer portion is m. The ratio m/l is theoretically as m/l=0.83, but can be practically set as m/l=1. These two divided electrodes are insulated from one another. A circular electrode 14 is fixed to the lower side of the transducer 11. A transformer 5 has a primary winding and a secondary winding. One end of the secondary winding is connected to the inner electrode 12, and the other end thereof is connected to the outer electrode 13, and the intermediate tap thereof is connected to the lower side electrode 14.

In radiation, the primary winding is supplied with a pulse signal having a carrier frequency of, for example, 50 kHz. The pulse signal is obtained by modulating in amplitude a carrier signal having the carrier frequency with a pulse. Accordingly, the central electrode 12 is supplied with a signal having an amplitude level "p", and the ring-like electrode 13 is supplied with a signal having an amplitude level "q", as shown in FIG. 2(A). The lower electrode 14 is supplied with a signal having zero amplitude "a". As a result, a substantially uniform radiation beam is formed as shown in FIG. 2(B). The directional radiation response is substantially the same at the same distance from the transducer within an angular range from "$-\theta_0$" to "$\theta_0$".

In reception, it is assumed that an incoming signal of a constant amplitude level having a carrier frequency of 50 kHz is received by the electrodes 12 and 13 of the transducer 11. A signal having a relative amplitude level "p" is obtained at the primary winding 8 based on the signal caught by the central electrode 12, and a signal having an amplitude level "q" is obtained at the primary winding 8 based on the signal received by the ring-like electrode 13. A signal of a zero amplitude level "a" is obtained at the primary winding 8 based on the signal derived from the lower electrode 14. The signals having the amplitude levels "p", "q" and "a" are combined with one another to form a uniform reception beam. Accordingly, incoming signals are received by a substantially uniform reception beam formed, the directional characteristics of which are substantially the same as shown in FIG. 2(B).

Figure 4:
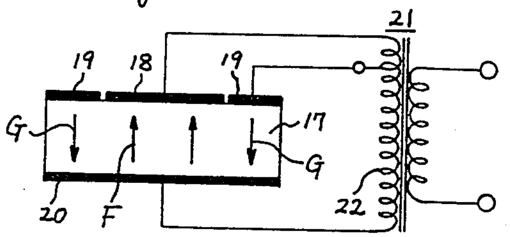
FIG. 4 shows a circuit diagram of a beam forming device according to an embodiment of the invention.

Referring to FIG. 4, the electrode on the upper side of a circular electrostrictive transducer 17 is circularly divided into two portions in such a way that the diameter of the inner portion 18 of the electrode is 2l and the width of the outer portion 19 is m. These two divided electrodes are insulated from one another. A circular electrode 20 is fixed to the lower side of the transducer 17. The portion of the transducer 17 between the electrodes 18 and 20 is polarized in a direction represented as "F", and the portion thereof between the electrodes 19 and 20 is polarized in a direction represented as "G". A transformer 21 has a primary winding and a secondary winding 22. One end of the secondary winding 22 is connected to the central electrode 18, and the other end thereof is connected to the lower side electrode 20, and the intermediate tap thereof is connected to the ring-like electrode 19.

In radiation, the primary winding of the transformer 21 is supplied with the same pulse signal as mentioned above. Consequently, a signal having an amplitude level "p" is applied to the central electrode 18 of the transducer 17, and a signal having an amplitude level "$-q$" is applied to the ring-like electrode 19, and a signal having a zero amplitude level "a" is fed to the lower electrode 20, with reference to FIGS. 4 and 2(A). As a result, the portion of the transducer 17 between the electrodes 18 and 20 is vibrated at the strength represented as "p", and the portion thereof between the electrodes 19 and 20 is vibrated at the strength represented as "q", thereby forming a substantially uniform radiation beam as shown in FIG. 2(B).

In reception, it is assumed that an incoming signal of a constant amplitude level having a carrier frequency of 50 KHz is received by the electrodes 18 and 19 of the transducer 17. A signal having an amplitude level "p" is obtained at the primary winding based on the signal caught by the central electrode 18, and a signal having an amplitude level "q" is obtained at the primary winding based on the signal received by the ring-like electrode 19. A signal of zero amplitude level "a" is transmitted to the primary winding based on the signal derived from the lower electrode 20. The signals having the amplitude levels "p", "q" and "a" are combined to form a uniform reception beam, the directional characteristics of which are substantially the same as shown in FIG. 2(B).

Figure 5:
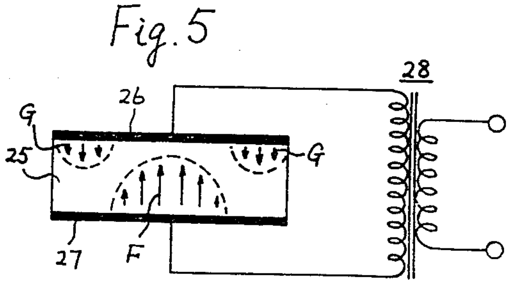
FIG. 5 shows a circuit diagram of a beam forming device according to an embodiment of the invention.

Referring to FIG. 5, a circular electrostrictive transducer 25 has an upper electrode 26 and a lower electrode 27 fixed to the upper and lower sides of the transducer respectively. The transducer 25 is polarized in a direction represented as "F" within an imaginary circle centered thereon, the diameter of which being 2 l. Each point of the transducer 25 is polarized with the degree of polarization determined by the equation $y=2J_1(x)/x$. The ring-like portion of the transducer 25 outside the circle is is polarized in a direction represented as "G", the width of the portion being m. Each point of the portion thereof is polarized with the degree of polarization determined by the equation. A transformer 28 has a primary winding and a secondary winding. One end of the secondary winding is connected to the upper electrode 26, and the other end of the secondary winding is connected to the lower electrode 27.

In transmission, the primary winding of the transformer 28 is supplied with the same pulse signal as mentioned above. Consequently, the entire radiation surface of the transducer 25 is vibrated at the strength determined by the equation $y=2J_1(x)/x$ as shown in FIG. 2(A), thereby forming an ideal uniform radiation beam as shown in FIG. 2(B).

In reception, it is assumed that the same incoming signal as mentioned above is received by the transducer 25. Signals having relative amplitude levels determined by the equation are derived from the respective points of the transducer, and transmitted to the primary winding to be combined with each other. As a result, an ideal uniform reception beam is formed as shown in FIG. 2(B).

Figure 6A:
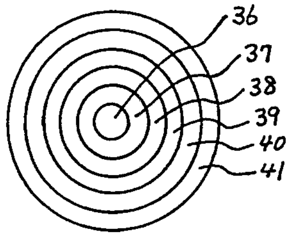
FIG. 6 shows a circular electrostrictive transducer used in a beam forming device according to an embodiment of the invention.
Figure 6B:
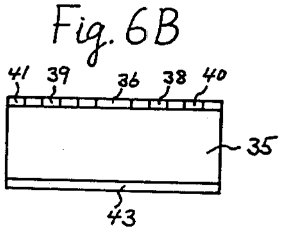
Figure 7:
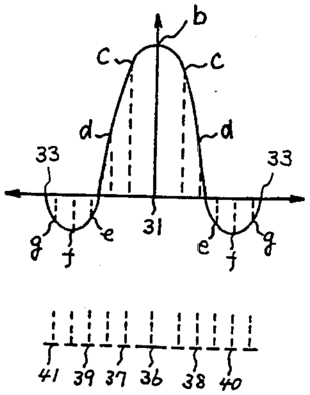
FIG. 7 shows the relationship between the signals applied to the transducer shown in FIG. 6 or the signals derived therefrom and the electrodes of the transducer.

Referring to FIG. 6, the electrode on the upper side of a circular electrostrictive transducer 35 is cut in concentric circles to be divided into one circular electrode element 36 and five ring-like elements 37, 38, 39, 40, 41. These six divided electrode elements are insulated from one another. A circular electrode 43 is fixed to the lower side of the transducer 35. The radius of the transducer 35 is 2 l. Referring to FIG. 7, a curve is drawn in accordance with the Bessel function $y=2J_1(x)/x$. One point 31 corresponds to the center of the transducer 35, and the other point 33 corresponds to the points on the circumference of the transducer. As in the foregoing embodiments, signals having desired amplitude levels are supplied to the respective elements through a transformer. Signals caught by the electrode elements are derived through the transformer to be combined with each other at the primary winding so that a reception beam is formed.

In radiation, a signal having an amplitude level "b" is applied to the electrode element 36, and a signal having an amplitude level "c" is applied to the electrode element 37. Similarly, signals having amplitude levels "d", "e", "f" and "g" are applied to the electrode elements 38, 39, 40 and 41 respectively. A signal having a reference amplitude level "a" is fed to the lower electrode 43. As a result, a uniform directional radiation response is obtained as shown in FIG. 2(B). The directional response is substantially the same at the same distance from the transducer 35 within an angular range from "$-\theta_0$" to "$\theta_0$".

In reception, it is assumed that an incoming signal of a constant amplitude level having a carrier frequency of 50 KHz is received by the electrode elements 36 through 41. A signal having a relative amplitude level "b" is transmitted to the primary winding of the transformer based on the signal caught by the element 36. Similarly, signals having amplitude levels "c", "d", "e", "f" and "g" are obtained at the primary winding of the transformer based on the incoming signals received by the elements 37, 38, 39, 40 and 41 respectively. A signal having a reference amplitude level "a" is obtained based on the output signal from the lower electrode 43. As a result, incoming signals caught by a reception beam as shown in FIG. 2(B) are outputted from the primary winding of the transformer.

Figure 8A:
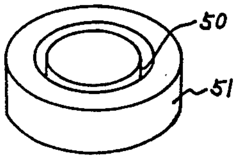
FIG. 8 shows a circuit diagram of a beam forming device according to an embodiment of the invention.
Figure 8B:
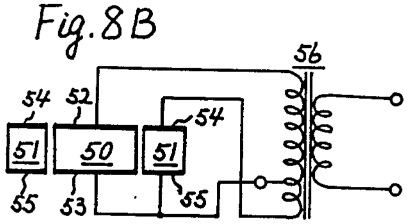

Referring to FIG. 8, a circular electrostrictive transducer 50 has an upper electrode 52 and a lower electrode 53 fixed to the upper and lower sides of the transducer respectively. The diameter of the circular transducer is 2 l. A ring-like electrostrictive transducer 51 has an upper electrode 54 and a lower electrode 55 fixed to the upper and lower sides thereof, with the width of the transducer 51 being m. The transducer 51 is disposed in a concentric relation with the circular transducer 50. A transformer 56 has a primary winding and a secondary winding. One end of the secondary winding is connected to the upper electrode 52 of the transducer 50, and the other end thereof is connected to the upper electrode 54 of the transducer 51. The intermediate tap of the secondary winding is connected to the lower electrodes 53 and 55.

In transmission, a signal having a carrier frequency of, for example, 50 KHz is supplied to the primary winding of the transformer 56. Referring also to FIG. 2(A), One point 31 corresponds to the center of the transducer 50, and the other point 33 corresponds to the points on the circumference of the transducer 51. A signal having an amplitude level "p" is provided to the upper electrode 52 of the circular transducer 50, and a signal having an amplitude level "q" is supplied to the upper electrode 54 of the ring-like transducer 51. A signal having a reference amplitude level "a" is provided to the lower electrodes 53 and 55 of the transducers. As a result, a directional radiation response is obtained as shown in FIG. 2(B). The directional response is substantially the same at the same distance from the transducers within an angular range from "$-\theta_0$" to "$\theta_0$". Thus, an intrinsically uniform reception beam is formed.

In reception, as in the foregoing embodiment shown in FIG. 3, signals having relative amplitude levels "p" and "q" are transmitted to the primary winding of the transformer based on the echo signals received by the electrodes 52 and 54 respectively. Signals having a reference amplitude level "a" are obtained at the primary winding based on the signals from the electrodes 53 and 55. The signals having the amplitude levels "p", "q" and "a" are combined with one another to obtain a directional reception response as shown in FIG. 2(B). The echo signals caught by the resultant reception beam are outputted from the primary winding.

Figure 9:
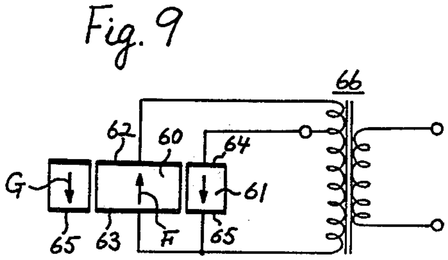
FIG. 9 shows a circuit diagram of a beam forming device according to an embodiment of the invention.

Referring to FIG. 9, a circular electrostrictive transducer 60 has an upper electrode 62 and a lower electrode 63 fixed to the upper and lower sides thereof, with the diameter of the electrodes 62, 63 being 2 l. A ring-like transducer 61 has an upper electrode 64 and a lower electrode 65 fixed to the upper and lower sides thereof, with the width of the transducer 61 being m. The ring-like transducer 61 is disposed in a concentric relation with the transducer 60. The central transducer 60 is polarized in a direction "F", and the outer transducer 61 is polarized in a direction "G". A transformer 66 has primary and secondary windings. One end of the secondary winding is connected to the upper electrode 62 of the transducer 60, and the other end of the secondary winding is connected to the lower electrodes 63 and 65 thereof. The intermediate tap of the secondary winding is connected to the upper electrode 64 of the outer transducer 61.

In radiation, the same signal mentioned above is supplied to the primary winding of the transformer. A signal having an amplitude level "p" is provided to the upper electrode 62, and a signal having an amplitude level "$-$q" is applied to the upper electrode 64, and a signal having a reference amplitude level "a" is fed to the lower electrodes 63 and 65 of the transducers. Referring also to FIG. 2(A), one point 31 corresponds to the center of the central electrode 62, and the other point 33 corresponds to the points on the outer circumference of the transducer 61. As a result, a directional radiation response is obtained as shown in FIG. 2(B), as in the foregoing embodiments shown in FIGS. 3 and 8.

In reception, signals having relative amplitude levels "p" and "q" are obtained at the primary winding based on the echo signals caught by the upper electrodes 62 and 64. A signal having a reference amplitude level "a" is transmitted to the primary winding based on the output signals from the lower electrodes 63 and 65. These signals are combined with one another to form a reception beam as shown in FIG. 2(B).

Figure 10:
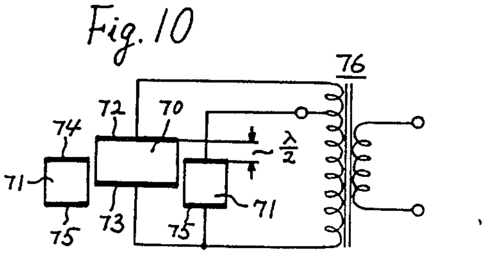
FIG. 10 shows a circuit diagram of a beam forming device according to an embodiment of the invention.

Referring to FIG. 10, a circular electrostrictive transducer 70 has an upper electrode 72 and a lower electrode 73 fixed to the upper and lower sides thereof, with the diameter of the electrodes 72, 73 being 2 l. A ring-like transducer 71 has an upper electrode 74 and a lower electrode 75 fixed to the upper and lower sides thereof, with the width of the outer transducer being m. The outer transducer 71 is disposed in a concentric relation with the inner transducer 70, and if fixedly placed at a position lower than the transducer 70 by $\lambda/2$. Here, $\lambda$ is the wavelength of the carrier included in signals radiated or received by the transducers 70 and 71. A transformer 76 has a primary winding and a secondary winding. One end of the secondary winding is connected to the upper electrode 72 of the inner transducer 70, and the other end of the secondary winding is connected to the lower electrodes 73, 75 of the transducers, and the intermediate tap thereof is connected to the upper electrode 74.

In transmission, a signal having a carrier frequency of, for example, 50 KHz is supplied to the primary winding, so that a signal having an amplitude level "p" is applied to the electrode 72 and a signal having an amplitude level "$-q$" is supplied to the electrode 74 and a signal having a reference amplitude level "a" is applied to the electrodes 73 and 75 of the transducers. As a result, there is obtained a directional radiation response which is substantially the same within a range of directions from "$-\theta_0$" to "$\theta_0$".

In reception, signals having relative amplitude levels "p" and "q" are derived based on the incoming signals received by the electrodes 72 and 74 respectively. A signal having a reference amplitude level "a" is obtained at the primary winding. The signals are combined with one another to obtain a directional reception response substantially the same as shown in FIG. 2(B). The echo signals caught by the reception beam having the response are outputted from the transformer 76.

Figure 11:
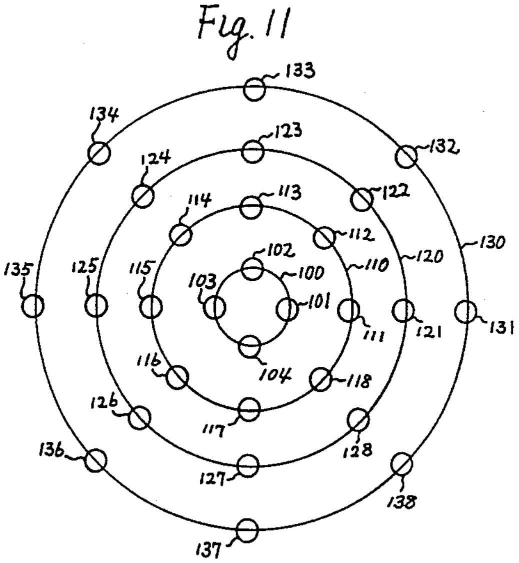
FIG. 11 shows an arrangement of the transducers used in a beam forming device according to an embodiment of the invention.

Referring to FIG. 11, a plurality of electrostrictive transducers are arranged on a number of imaginary concentric circles. Electrostrictive transducers 101 through 104 are disposed on a circle 100 at an equal distance therebetween. Similarly, electrostrictive transducers 111 through 118 are disposed on a circle 110. Electrostrictive transducers 121 through 128 are disposed on a circle 120. Electrostrictive transducers 131 through 138 are disposed on a circle 130 at an equal distance therebetween.

In radiation, the transducers 101 through 104 on the circle 100 are supplied with signals having an amplitude level "c" shown in FIG. 7, and the transducers 111 through 118 on the circle 110 are supplied with signals having an amplitude level "d", and the transducers 121 through 128 on the circle 120 are supplied with signals having an amplitude level "e", and the transducers 131 through 138 on the circle 130 are supplied with signals having an amplitude level "f". As a result, a uniform radiation beam is obtained, the directional characteristics of which are substantially the same as shown in FIG. 2(B).

In reception, an incoming signal of a constant amplitude level having a carrier frequency of 50 kHz is received by the transducers arranged on the circles 100, 110, 120 and 130. Signals having an amplitude level "c" are derived from the signals received by the transducers 101 through 104 arranged on the circle 100. Signals having an amplitude level "d" are derived from the signals caught by the transducers 111 through 118 on the circle 110. Similarly, signals having amplitude levels "e" and "f" are derived from the signals caught by the transducers 121 through 128 on the circle 120 and the transducers 131 through 138 on the circle 130 respectively. The signals having relative amplitude levels "c", "d", "e" and "f" are combined with one another. As a result, a substantially uniform reception beam is obtained as shown in FIG. 2(B).

It should be noted that magnetostrictive transducers can be used and arranged on the circles in place of the electrostrictive transducers in FIG. 11, to achieve the same result, i.e., to obtain a uniform radiation or reception beam.

Figure 12A:
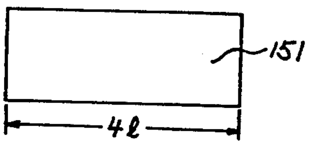
FIG. 12 shows an electrostrictive transducer shaped in the form of a rectangular parallelpiped used in a beam forming device according to an embodiment of the invention.
Figure 12B:
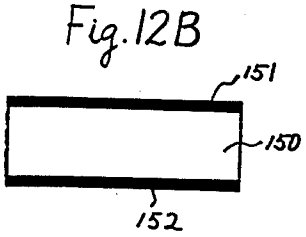
Figure 13A:
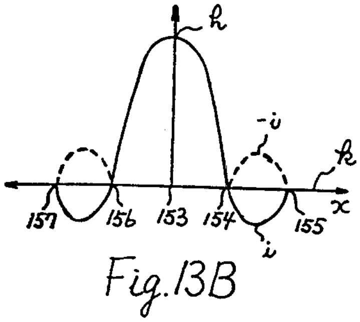
FIG. 13(A) shows a curve representing the amplitude levels of the signals radiated from the transducer or the amplitude levels of the signals derived therefrom.

Referring to FIG. 12, an electrostrictive transducer 150 is shaped in the form of a rectangular parallelpiped, with the width thereof being 4 l. The rectangular parallelpiped transducer 150 has an upper electrode 151 and a lower electrode 152 fixed to the upper and lower sides of the transducer respectively. Referring to FIG. 13(A), a curve is drawn in accordance with a weight function $y=\sin A/A$.

Figure 13B:
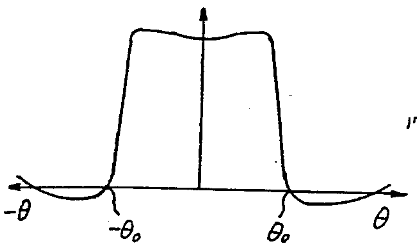
FIG. 13(B) shows the directional radiation or reception characteristics obtained by a beam forming device according to an embodiment of the invention.

In radiation, the curve represents the strength of vibration at one of the corresponding points of the transducer 150. Here, $A=2\pi x\,\theta_0$; x is the distance between the imaginary mid-vertical line on the transducer 150 and an imaginary vertical line thereon; and $\theta$ is the directional angle of a radiation beam formed. Points 154, 155, 156 and 157 are represented as $l/\lambda$, $2l/\lambda$, $-l/\lambda$ and $-2l/\lambda$ respectively. The resultant directional angle of $\theta$ of a radiation beam formed is expressed as $\theta_0=\lambda/2l$. $\lambda$ is the wavelength of a carrier for carrying signals which are applied to the electrode to cause the vibrations in the transducer 150. One point 153 corresponds to the mid-vertical line of the transducer; another point 154 corresponds to an imaginary vertical line which is to the right of the midline by the distance l; the point 155 corresponds to an imaginary rightmost vertical line thereon; the point 156 corresponds to an imaginary vertical line which is to the left of the midline by the distance l; and the point 157 corresponds to an imaginary leftmost vertical line on the transducer 150, which is to the left of the midline by the distance 2 l. Thus, the points on the mid-vertical line are vibrated at the strength represented as "h", and the points on the four imaginary vertical lines are vibrated at a "zero" strength. The points between the midline and the imaginary vertical lines are vibrated at the strength determined by the equation $y=\sin A/A$ as shown in FIG. 13(A). As a result, a directional radiation response is obtained, the directional characteristics of which are shown in FIG. 13(B). The directional response is the same at the same distance from the transducer 150 within an angular range from "$-\theta_0$" to "$\theta_0$". Thus, a uniform transmission beam is formed.

The strength of vibration at each of the points of the transducer 150 is in direct proportion to the amplitude level of a signal applied to each point of the upper electrode 151 of the transducer 150. The signals result from, for example, a signal carried by a carrier having a carrier frequency of, for example, 50 kHz. In this case, the curve shown in FIG. 13(A) represents the amplitude levels of signals applied to respective points of the upper electrode 151. The points on the imaginary mid-vertical line are supplied with signals having an amplitude level "h", and the points on the four imaginary lines are supplied with a signal of a "zero" amplitude level. The points between the imaginary mid-vertical line and each of the four imaginary vertical lines on the transducer are supplied with the corresponding signals, the amplitude levels of which are determined by the equation y=sinA/A. The lower electrode 152 is supplied with a signal having a "zero" amplitude level. As a result, a uniform radiation beam is formed, as shown in FIG. 13(B).

In reception, the curve shown in FIG. 13(A) represents the amplitude levels of incoming signals received at and derived from the corresponding points of the transducer 150. Signals of respective various amplitude levels are derived from the corresponding points of the transducer and combined to form a uniform reception beam, the directional characteristics of which are shown in FIG. 13(B). The signals are carried by a carrier having a carrier frequency of 50 kHz. Signals having an amplitude level "h" are derived based on the sound energy received at the points on the midvertical line, and signals of a "zero" amplitude level are derived from the sound energy received at the points on the four vertical lines on the transducer. Based on the signals received at the points between the midline and the four vertical lines there are produced the signals of respective various amplitude levels determined by the equation y=sinA/A and shown in FIG. 13(A). The signals obtained based on the signals received at the points of the transducer are combined to form a uniform reception beam, the directional characteristics of which are shown in FIG. 13(B). Thus, an underwater detection system employing the beam forming device receives incoming signals in such a way that electrical signals of the same amplitude level are produced based on signals of the same energy measured at a distance from the device, coming within the angular range from "$-\theta_0$" to "$\theta_0$".

Figure 14A:
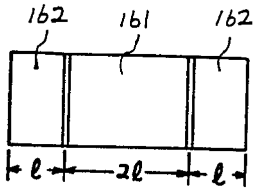
FIG. 14(A) shows the top view of the transducer used.
Figure 14B:
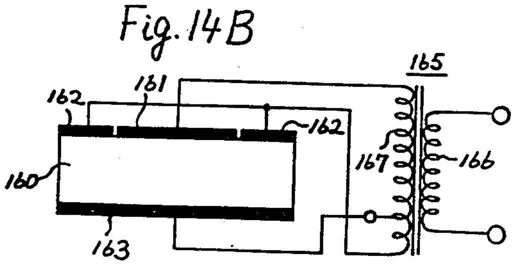
FIG. 14(B) shows the sectional view of the transducer and a related circuit diagram.

Referring to FIG. 14, an electrostrictive transducer 160 is shaped in the form of a rectangular parallelpiped. An inner rectangular electrode element 161 and outer rectangular electrode elements 162 are arranged on the upper side of the transducer 160, with the width of the central electrode element 161 being 2 l and the width of each of the outer electrode elements 162 being l. The three rectangular electrode elements are insulated from one another. A rectangular electrode 163 is fixed to the lower side of the transducer 160. A transformer 165 has a primary winding 166 and a secondary winding 167. One end of the secondary winding is connected to the inner electrode element 161, and the other end thereof is connected to the outer electrode elements 162, and the intermediate tap thereof is connected to the lower electrode 163.

In radiation, the primary winding is supplied with a signal including a carrier with its carrier frequency of, for example, 50 kHz. Accordingly, the inner electrode element 161 is supplied with a resultant signal having an amplitude level "h", and the outer electrode elements 162 are supplied with a resultant signal having an amplitude level "i", and the lower electrode 163 is supplied with a signal having a reference amplitude level "k", as shown in FIG. 13(A). As a result, a substantially uniform radiation beam is formed, the directional characteristics of which are substantially the same as shown in FIG. 13(B). The directional response is intrinsically the same at the same distance from the transducer within an angular range from "$-\theta_0$" to "$\theta_0$". The directional angle $\theta_0$ of the radiation beam is expressed as $\theta_0=\lambda/2l$. The points 154, 155, 156 and 157 are represented as l/λ, 2l/λ, −l/λ and −2l/λ respectively.

In reception, it is assumed that an incoming signal of a constant amplitude level having a carrier frequency of 50 kHz is received by the electrode elements 161, 162 of the transducer. A signal having an amplitude level "h" is obtained at the primary winding 166 based on the signal received by the inner electrode element 161, and a signal having an amplitude "i" is obtained thereat based on the signals caught by the electrode elements 162, and a signal of a reference amplitude level "k" is derived thereat based on the output signal from the lower electrode 163. The signals having the relative amplitude levels "h", "i" and "k" are combined with one another to form a uniform reception beam. Accordingly, incoming signals are received by the substantially uniform reception beam, the directional characteristics of which are substantially the same as shown in FIG. 13(B).

Figure 15:
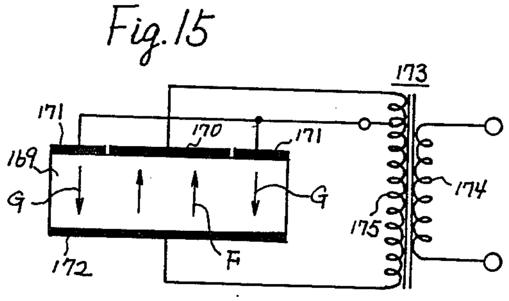
FIG. 15 shows a circuit diagram of a beam forming device according to an embodiment of the invention.

Referring to FIG. 15, an electrostrictive transducer 169 is shaped in the form of a rectangular parallelpiped. A rectangular electrode 170 with its width 2 l is fixed on the upper side of the transducer 169 at its central portion. Two rectangular electrodes 171 with its width l are fixed on both sides of the electrode 170. The three electrodes 177,171 are insulated from one another. A rectangular electrode 172 is fixed to the lower side of the transducer 169. The portion of the transducer 169 between the electrodes 170 and 172 is polarized in direction represented as "F", and the portion thereof between the electrodes 171 and 172 is polarized in direction represented as "G". A transformer 173 has a primary winding 174 and a secondary winding 175. One end of the secondary winding is connected to the central electrode 170, and the other end thereof is connected to the lower electrode 172, and the intermediate tap is connected to the upper and outer electrodes 171.

In radiation, the primary winding 174 of the transformer 173 is supplied with the same signal as mentioned above. Consequently, a resultant signal having an amplitude level "h" is applied to the central electrode 170 of the transducer 169, a signal having an amplitude level "−i" is supplied to the outer electrodes 171, and a signal having a reference amplitude level "k" is fed to the lower electrode 172. As a result, the portion of the transducer between the electrodes 170 and 172 is vibrated at the strength represented as "h", and the portion thereof between the electrodes 171 and 172 is vibrated at the strength represented as "i" in FIG. 13(A), thereby forming a substantially uniform radiation beam, the directional characteristics of which are substantially the same as shown in FIG. 13(B). It should be noted that the points 154, 155, 156 and 157 in FIG. 13(A) are also represented as l/λ, 2l/λ, −l/λ and −2l/λ respectively, as in the foregoing embodiments.

In reception, an incoming signal of a constant amplitude level having a carrier frequency of 50 kHz is received by the electrodes 170, 171 of the transducer 169.

Signals having relative amplitude levels "h" and "i" are obtained at the primary winding of the transformer 173 based on the signals caught by the electrodes 170 and 171 respectively. A signal having a reference amplitude level "k" is derived at the primary winding from the output signal from the lower electrode 172. The signal having three different amplitude levels are combined with one another to form a uniform reception beam, the directional characteristics of which are substantially the same as shown in FIG. 13(B).

Figure 16:
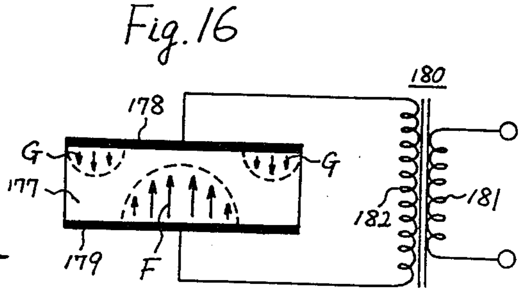
FIG. 16 shows a circuit diagram of a beam forming device according to an embodiment of the invention.

Referring to FIG. 16, an electrostrictive transducer 177 is in the form of a rectangular parallelpiped, with the width thereof being 4 l. The transducer 177 has an upper electrode 178 and a lower electrode 179 arranged on the upper and lower sides of the transducer 177 respectively. The transducer 177 is polarized in a direction represented as "F" within a rectangular area with its width 2 l at its central portion. Each point of the transducer 177 within this area is polarized with the degree of polarization determined by the equation y=-sinA/A. The outer rectangular portions of the transducer with the width of each being l is polarized in direction "G". Each point of the portions is polarized with the degree of polarization determined by the equation. A transformer 180 has a primary winding 181 and a secondary winding 182. One end of the secondary winding 182 is connected to the upper electrode 178, and the other end thereof is connected to the lower electrode 179.

In transmission, a signal including a carrier with its carrier frequency of, for example, 50 kHz is supplied to the primary winding 181. Consequently, the entire radiation surface of the transducer 177 is vibrated at the strength determined by the weight function y=sinA/A as shown in FIG. 13(A), thereby forming an ideal uniform radiation beam as shown in FIG. 13(B).

In reception, the same incoming signal as used in the foregoing embodiments is received by the transducer 177. It converts sound energy into electric energy. Signals having relative amplitude levels determined by the weight function are derived from the signals caught at the respective points of the transducer 177, and transmitted to the primary winding to be combined with one another. As a result, an ideal uniform reception beam is formed as shown in FIG. 13(B).

Figure 17:
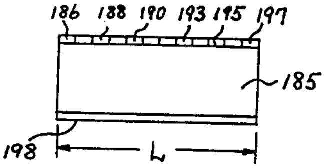
FIG. 17 shows an electrostrictive transducer in the form of a rectangular parallelpiped used in a beam forming device according to an embodiment of the invention.
Figure 18:
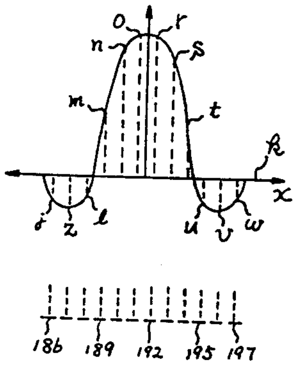
FIG. 18 shows the relationship between the signals applied to the transducer shown in FIG. 17 or the signals derived therefrom and the electrodes of the transducer.

Referring to FIG. 17, an electrostrictive transducer 185 is shaped in the form of rectangular parallelpiped, with its width being L. On the upper side of the transducer 185, rectangular electrode elements 186 through 197 are formed. They are insulated from one another. A rectangular electrode 198 is fixed to the lower side of the transducer 185. Referring to FIG. 18, a curve is drawn in accordance with the weight function y=-sinA/A. The vertical axis represents the amplitude levels of signals applied to the respective electrode elements, or those of the signals produced based on the incoming signals caught at points of the vibrating surface.

In radiation, as in the foregoing embodiments, signals having desired amplitude levels are supplied to the respective electrode elements and to the electrode through, for example, a transformer. A signal having an amplitude level "j" is applied to the electrode element 186, and a signal having an amplitude "z" is supplied to the electrode element 187. In the same manner, signals having amplitude levels "l", "m", "n", "o", "r", "s", "t", "u", "v" and "w" are supplied to the electrode elements 188, 189, 190, 191, 192, 193, 194, 195, 196 and 197 respectively. A signal having a reference amplitude level "k" is applied to the lower electrode 198. As a result, a uniform radiation beam is formed, the directional response are substantially the same as shown in FIG. 18.

In reception, an incoming signal of a constant amplitude level is received by the electrode elements 186 through 197. Signals having relative amplitude levels "j", "z", "l", "m", "n", "o", "r", "s", "t", "u" , "v", and "w" are obtained, for example, through a transformer based on the output signals from the electrode elements 186, 187, 188, 189, 190, 191, 192, 193, 194, 195, 196 and 197 respectively. A signal having a reference amplitude level "k" is derived from the output signal transmitted from the lower electrode 198. These signals are combined to form a reception beam as shown in FIG. 13(B).

Figure 19:
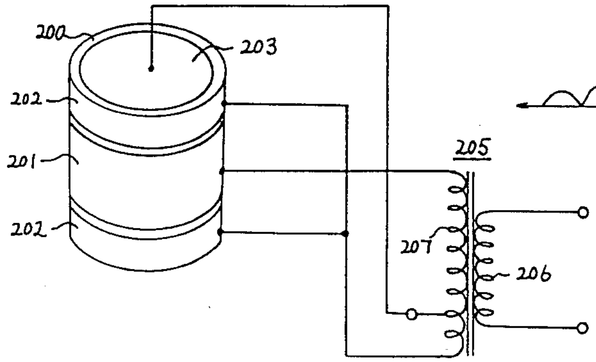
FIG. 19 shows a circuit diagram of a beam forming device according to an embodiment of the invention.
Figure 27:
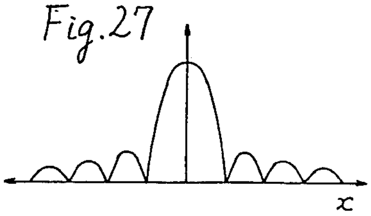
FIG. 27 shows the directional characteristics obtained by a prior art beam forming device.

Referring to FIG. 19, an electrostrictive transducer 200 is shaped in a cylindrical form. A central ring-like electrode element 201 with the width of 2 l is fixed on the outer surface of the transducer 200. On both sides of the electrode element 201 are attached side ring-like electrode elements 202 with the width of l. The three electrode elements 201, 202 are insulated from one another. An electrode 203 is fixed on the entire inner surface of the transducer 203. A transformer 205 has a primary winding 206 and a secondary winding 207. One end of the secondary winding is connected to the central electrode element 201, and the other end thereof is connected to the side electrode elements 202, and an intermediate tap thereof is connected to the inner electrode 203.

In radiation, the primary winding 206 is supplied with a signal including a carrier with its carrier frequency of 50 KHz . Accordingly, the central electrode element 201 is supplied with a resultant signal having an amplitude level "h", and the side electrode elements 202 are supplied with a resultant signal having an amplitude level "i", and the inner electrode 203 is supplied with a signal having a reference amplitude level "k" as shown in FIG. 13(A). As a result, a uniform radiation beam is formed along the circumference of the cylindrical transducer, the directional characteristics of the beam are substantially the same as shown in FIG. 13(B). As in the embodiment shown in FIG. 14, the directional angle $\theta_0$ of the radiation beam is expressed as $\theta_0=\lambda/2l$. The points 154, 155, 156 and 157 are represented as $l/\lambda$, $2l/\lambda$, $-l/\lambda$ and $-2l/\lambda$ respectively.

In reception, an incoming signal with a constant amplitude level is received by the electrode elements 201 and 202 of the transducer. A signal having a relative amplitude level "h" is obtained at the primary winding 206 based on the sound energy received by the central electrode element 201, and a signal having an amplitude level "i" is derived thereat based on the signal caught by the side electrode elements 202, and a signal with a reference amplitude level "k" is obtained thereat based on the output signal from the inner electrode 203. The signals having the relative amplitude levels "h", "i", and "k" are combined to form a uniform reception beam, the directional characteristics of which are substantially the same as shown in FIG. 13(B).

Figure 20A:
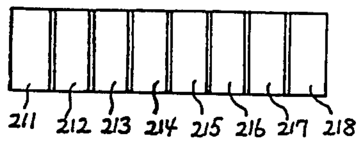
FIG. 20 shows a circuit diagram of a beam forming device for selectively forming one of uniform radiation or reception beams with different beam widths.

Referring to FIG. 20, an electrostrictive transducer 210 is in the form of a rectangular parallelpiped. On the upper side of the transducer 210 there are arranged rectangular electrode elements 211 through 218, with the width of each element being l. These electrode elements are insulated from one another. A rectangular electrode 219 is on the lower side of the transducer. A transformer 220 has a primary winding 221 and a secondary winding 222. One end of the secondary winding 222 is connected to the electrode elements 213, 214, 215 and 216, and the other end thereof is connected to the electrode elements 211, 212, 217 and 218, and an intermediate tap thereof is connected to the electrode 219. Another transformer 225 has a primary winding 226 and a secondary winding 227. One end 228 of the secondary winding 227 is connected to the electrode elements 214 and 215, and the other end 229 thereof is connected to the electrode elements 213 and 216, and an intermediate tap 230 is connected to the electrode elements 212 and 217, and another intermediate tap 231 is connected to the electrode elements 211 and 218, and an intermediate tap 232 is connected to the lower electrode 219. Both ends of the primary winding 221 of the transformer 220 are connected to switch contacts S1 respectively, and both ends of the primary winding 226 of the transformer 225 are connected to switch contacts S2 respectively. A switch 235 has two switch elements 236 and 237 which are connected respectively to two output terminals of a signal generator 238 which produces a pulse signal having a carrier frequency of 50 KHz. The pulse signal is obtained by modulating in amplitude a carrier with a pulse.

Figure 21A:
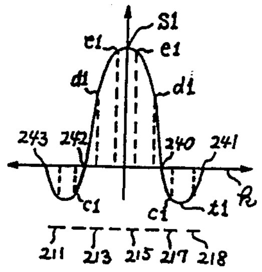
FIGS. 21(A) and (C) show curves representing the amplitude levels of the signals transmitted from the transducer or the amplitude levels of the signals derived based on the output signals from the transducer.
Figure 21B:
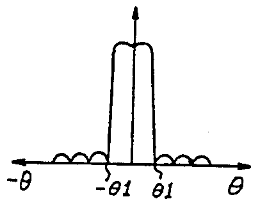
FIGS. 21(B) and (D) show the corresponding directional radiation or reception characteristics obtained by the beam forming device shown in FIG. 21.

It is now assumed that the switch elements 236 and 237 are connected to the switch contacts S1, and the pulse signal from the signal generator 238 is supplied with the primary winding 221 of the transformer 220. Referring to FIG. 21(A), a curve is drawn in accordance with a weight function $y = \sin A_1/A_1$. In radiation, the curve represents the strength of vibration at one of the corresponding points on the vibrating surface of the transducer 210. Here, $A_1 = 2\pi(l/\lambda)\theta_1$; l is the width of the electrode element; λ is the wavelength of a carrier for carrying signals which are applied to the electrode elements to cause the vibrations in the transducer 210; and $\theta_1$ is the directional angle of a beam formed. The points 240, 241, 242 and 243 are represented as l/λ, 2l/λ, l/λ and −2l/λ respectively. The lower electrode 219 is supplied with a signal having a reference amplitude level "k" from the intermediate tap of the secondary winding 222 of the transformer 220. A resultant signal having an amplitude level "s1" is applied to the electrode elements 213, 214, 215 and 216, and a resultant signal having an amplitude level "t1" is supplied to the electrode elements 211, 212, 217 and 218. As a result, a uniform radiation beam is formed, the directional characteristics of which are shown in FIG. 21(B). The amount of the sound energy radiated from the transducer 210 is the same at the same distance therefrom within an angular range from "$-\theta_1$" to "$\theta_1$".

In reception, the curve shown in FIG. 21(A) represents the amplitude levels of signals derived from the signals received and transmitted from the corresponding points of the transducer 210. Signals of respective various amplitude levels are derived from the corresponding points on the vibrating surface of the transducer and combined to form a uniform reception beam as shown in FIG. 21(B). An incoming signal having a constant amplitude level is received by the electrode elements 211 through 218. Signals having a relative amplitude level "s1" are obtained at the primary winding 221 of the transformer 220 based on the sound energy received by the electrode elements 213 through 216, and signal having an amplitude level "t1" are derived at the winding 221 based on the echo signals received by the electrode elements 211, 212, 217 and 218, and a signal having a reference amplitude level "k" is obtained thereat based on the signal transmitted from the lower electrode 219. As a result, incoming signals received by a uniform reception beam, the directional characteristics of which are shown in FIG. 21(B), are transmitted from the primary winding 221 to an indicator through an amplifier.

Figure 21C:
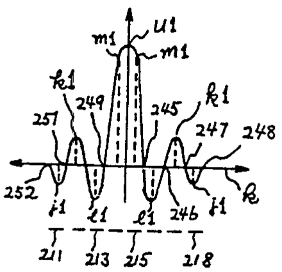
FIG. 21 shows the relationship between the signals applied to the transducer shown in FIG. 20 or the signals derived therefrom and the directional characteristics obtained by the beam forming device in FIG. 20.

Next, the switch elements 236 and 237 are connected to the switch contacts S2, and the pulse signal from the signal generator 238 is supplied with the primary winding 226 of the transformer 225, or incoming signals caught by the transducer are outputted from the primary winding 226 thereof. Referring to FIG. 21(C), a curve is drawn in accordance with a weight function $y = \sin A_2/A_2$. In radiation, the curve represents the strength of vibration at one of the corresponding points on the vibrating surface of the transducer 210. In reception, the curve represents the amplitude levels of signals derived from the signals received and transmitted from the corresponding points on the vibrating surface of the transducer 210. Here, $A_2 = 2\pi(l/\lambda)\theta_2$; and $\theta_2$ is the directional angle of a beam formed. The points 245, 246, 247, 248, 249, 250, 251 and 252 are represented as l/2λ, l/λ, 3l/2λ, 2l/3λ, −l/2λ −l/λ, −3l/2λ and −2l/λ respectively.

Figure 21D:
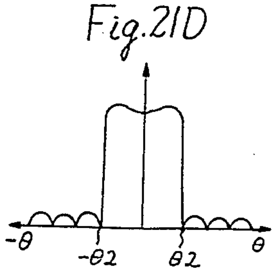

In radiation, the lower electrode 219 is supplied with a signal having a reference amplitude level "k" from an intermediate tap 232 of the secondary winding 227 of the transformer 225. A resultant signal having an amplitude level "u1" is supplied to the electrode elements 214 and 215 from one end 228 of the secondary winding 227, and a signal having an amplitude level "l1" is applied to the electrode elements 213 and 216 from the other end 229 of the secondary winding 227, and a resultant signal having an amplitude level "k1" is supplied to the electrode elements 212 and 217 from an intermediate tap 230 of the winding 227, and a signal having an amplitude level "j1" is supplied from an intermediate tap 231 and applied to the electrode elements 211 and 218. As a result, a uniform transmission beam is formed, the directional characteristics of which are shown in FIG. 21(D). The pressure strength of the sound radiated from the transducer 210 is the same at the same distance therefrom within an angular range from "$-\theta_2$" to "$\theta_2$".

In reception, an incoming signal having a constan amplitude level is received by the electrode elements 211 through 218. Signals having a relative amplitude level "u1" are obtained at the primary winding 226 based on the sound energy received by the electrode elements 214 and 215, and signals having relative amplitude levels "l1", "k1", and "j1" are derived at the winding 226 based on the signals received by pairs of the electrode elements of 213 and 216, of 212 and 217, and of 211 and 218 respectively. A signal having a reference amplitude level "k" is derived at the winding 226 based on the output signal from the lower electrode 219. As a result, a uniform reception beam is formed, the directional characteristics of which are shown in FIG. 21(D). The signals caught by this beam are transmitted to an indicator through an amplifier. The relationship between the directional angles $\theta_1$ and $\theta_2$ of the beams is $\theta_2 = 2\theta_1$.

Accordingly, a narrow radiation beam with its directional angle $\theta_1$ or a broad radiation beam with the directional angle $\theta_2$ is selectively formed. Similarly the narrow reception beam or the broad reception beam is selectively formed.

It should be noted that a uniform radiation beam can also be formed by applying signals having different amplitude levels to the corresponding electrode elements. For example, with reference to FIGS. 21(A) and (B), signals having an amplitude "e1" are supplied to the electrode elements 214 and 215 and signals having an amplitude level "d1" are applied to the electrode elements 213 and 216, and signals having an amplitude level "c1" are supplied to the electrode elements 212, 217, 211 and 218. In this case, a more preferable uniform radiation beam is formed as compared with the one formed in the foregoing embodiment. Similarly, a uniform reception beam can be formed by deriving electric signals having amplitude levels "e1", "d1", and "c1" at the primary winding 226 based on the signals received by the electrode elements of 214 and 215, of 213 and 216, and of 212, 217, 211 and 218 respectively.

Figure 20B:
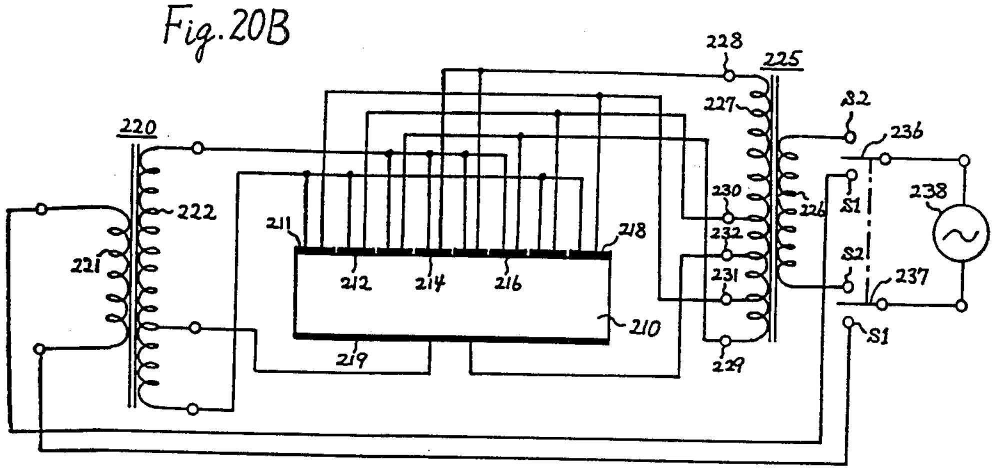

It should be noted that with reference to FIG. 20(B), switches are inserted between the electrode elements 211 through 218 and the corresponding taps of the secondary windings 222 and 227 of the transducers 220 and 225. The switches are not shown in FIG. 20(B) to simplify the explanation thereof. While the switch 235 connects the outputs of the signal generator 238 to the primary winding 221 of the transformer 220, the connections between the taps of the secondary winding 227 of the transformer 225 and the corresponding electrode elements 211 through 218 are disconnected, but, the taps of the secondary winding 222 of the transformer 220 remain connected to the corresponding electrode elements of the transducer 210. While the switch 235 connects the output of the signal generator 238 to the primary winding 226 of the transformer 225, some of the switches connect the taps of the secondary winding 227 of the transformer 225 to the corresponding electrode elements, and the rest of the switches disconnect the taps of the secondary winding 222 from the corresponding electrode elements of the transducer 210.

Figure 22:
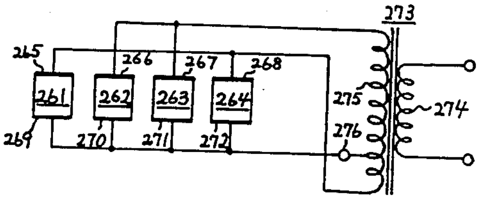
FIG. 22 shows a circuit diagram of a beam forming device using independent transducers, according to an embodiment of the invention.

Referring to FIG. 22, electrostrictive transducers 261, 262, 263 and 264 are arranged on an imaginary straight line at equal distances d therebetween. The transducer 261 with its width l has an upper electrode 265 and a lower electrode 269. Similarly, the transducers 262, 263 and 264 have upper electrodes 266, 267 and 268 with the width of l, and lower electrodes 270, 271 and 272 respectively. A transformer 273 has a primary winding 274 and a secondary winding 275. One end of the secondary winding 275 is connected to the upper electrodes 266 and 267, and the other end of the secondary winding 275 is connected to the electrodes 265 and 268, and the intermediate tap 276 is connected to the electrodes 269, 270, 271 and 272.

In radiation, the primary winding 274 is supplied with the same pulse signal as mentioned above. Referring also to FIG. 13, a resultant signal having an amplitude level "h" is supplied to the electrode elements 266 and 267, and a signal having an amplitude level "i" is applied to the electrodes elements 265 and 268, and a signal having a reference amplitude level "k" is supplied to the lower electrodes 269 through 272 of the transducers 261 through 264. As a result, a uniform radiation beam is formed, the directional characteristics of which are substantially the same as the one shown in FIG. 13(B). It should be noted that the distance d between the adjacent transducers is set as $D<\lambda$. $\lambda$ is the wavelength of a carrier for carrying signals which are applied to the electrodes of the transducers.

In reception, an incoming signal having a constant amplitude level is received by the transducers 261 through 264. Signals having an amplitude level "h" are derived at the primary winding 274 based on the sound energy received by the transducers 262 and 263, and electrical signals having an amplitude level "i" are produced thereat based on the signals received by the transducers 261 and 264, and a signal having a reference amplitude level "k" is obtained thereat based on the output signals from the electrodes 269 through 272. The electrical signals having relative amplitude levels "h", "i" and "k" are combined to form a uniform reception beam as shown in FIG. 13(B). The directional angle $\theta_0$ of the reception beam is expressed as as $\theta_0=\lambda/2l$.

Figure 23:
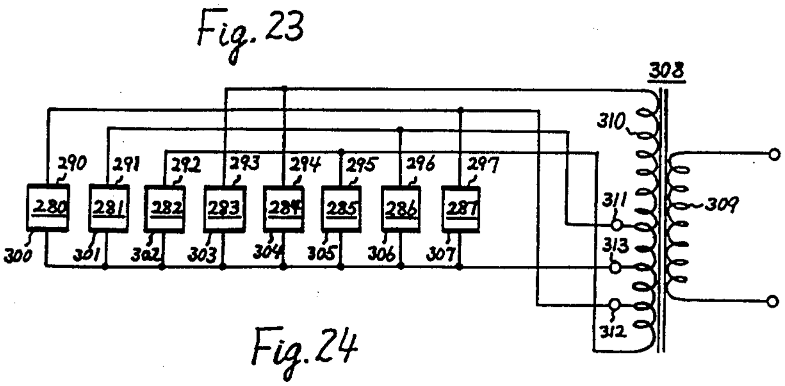
FIG. 23 shows a circuit diagram of a beam forming device according to an embodiment of the invention, using independent transducers.

A larger number of electrostrictive transducers can also be arranged on an imaginary straight line at the equal distances d between adjacent transducers in order to form a uniform radiation or a reception beam, as shown in FIG. 23.

Figure 24:
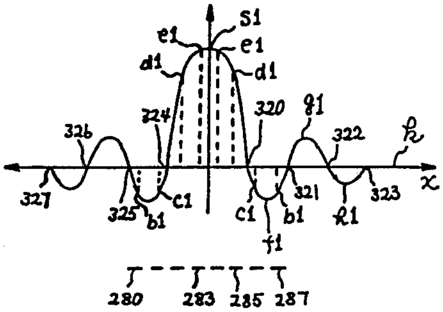
FIG. 24 shows the relationship between the transducers shown in FIG. 23 and the signals applied to the transducer shown in FIG. 23 or the signals derived therefrom.

In radiation, for example, with reference to FIGS. 23 and 24, signals having amplitude levels "s1", "f1", "g1", "h1"and "k" are applied to the corresponding electrodes 290 through 297 and 300 through 307 to form a uniform radiation beam. Signals having amplitude levels "e1", "d1", "c1" and "k" can also be used for forming a radiation beam. The signals are supplied to the corresponding electrodes of the transducers.

A uniform radiation beam can be formed by deriveing signals having the amplitude levels represented in FIG. 24 based on the incoming signals received by the corresponding transducers and by combining the derived signals.

It should be noted that magnetostrictive transducers can also be used in place of the electrostrictive transducers 261 through 264 and the transducers 280 through 287, in order to form a uniform radiation or a reception beam, the directional characteristics of which are shown in FIG. 13.

Figure 25:
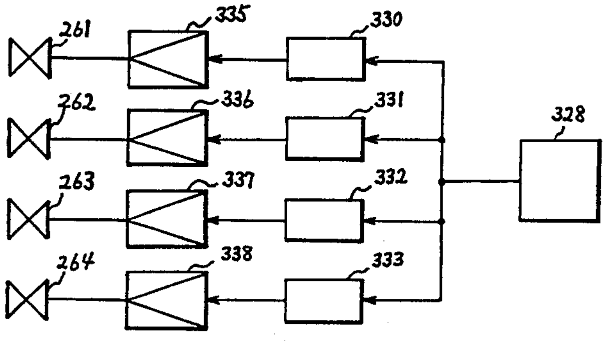
FIG. 25 shows a circuit block diagram of a beam forming device which is capable of forming a uniform radiation beam in a direction from zero to 180 degrees with respect to an imaginary line on which the transducers are disposed.

Referring to FIG. 25, a signal generator 328 produces a pulse signal including a carrier, the frequency of which is, for example, 200 KHz. The output of the signal generator 328 is coupled to the inputs of phase-shifters 330 through 333. Each of the phase-shifters may be comprised of a delay circuit including inductors and capacitors, which is well known in the art, and functions to shift an input signal in phase by an amount which is variable. The outputs of the phase-shifters 330 through 333 are connected to the inputs of corresponding amplifiers 335 through 338. The amplification gain of each amplifier is variable. The outputs of amplifiers 335 through 338 are connected to corresponding transducers 261 through 264. The electrostrictive transducers are arranged on an imaginary straight line at the equal distance d therebetween, and radiates sound energy in response to input electricsl signals.

It is now assumed that the phase-shift amount assigned to each phase shifter is zero. Thus, the output signals from the signal generator 328 are supplied to the inputs of the amplifiers 335 through 338 through the phase-shifters 330 through 333 without any delay in the transmission thereof. The amplification gain of the amplifiers 336 and 337 is adjusted so that signals having an amplitude level "h" are outputted from the amplifiers and supplied to the corresponding transducers 262 and 263. Ultrasonic waves are radiated by the transducers in response to the signals. The gain of the amplifiers 335 and 338 is set so that signals having an amplitude level "i" are supplied to the corresponding transducers 261 and 264. As a result, a uniform radiation beam as shown in FIG. 13(B) is formed in a direction perpendicular to the imaginary line. The pointing direction of the uniform radiation beam is varied from zero to 180 degrees with respect to the straight line by appropriately determining a phase-shift amount assigned to a corresponding phase-shifter.

Figure 26:
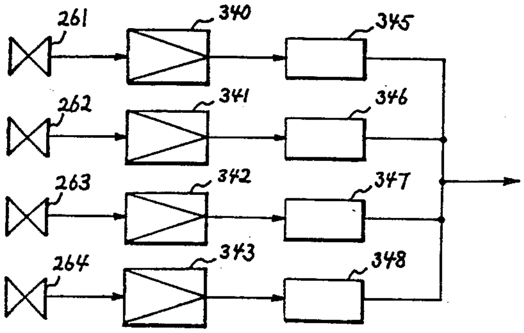
FIG. 26 shows a circuit block diagram of a beam forming device which is capable of forming a uniform reception beam in a direction from zero to 180 degrees with respect to the line.

Referring to FIG. 26, the electrostrictive transducers 261 through 264 disposed on the imaginary line at the equal distances d are connected to the inputs of corresponding amplifiers 340 through 343. The amplifiers are constructed in a way that the amplification gains thereof are variable. The outputs of amplifiers 340 through 343 are connected to the inputs of phase-shifters 345 through 348 respectively. Each phase-shifter is constructed in the same way as the phase-shifter 330. The output signals from the phase-shifters 345 through 348 are combined with one another to form a reception beam.

In operation, an incoming signal having a constant amplitude level is received by the transducers 261 through 264. The amplification gains of the amplifiers 341 and 342 are set so that signals having an amplitude level "h" are outputted based on the sound energy received by the transducers 262 and 263. The ampifiers 340 and 343 are adjusted so that signals having an amplitude level "i" are transmitted to the phase-shifters 345 and 348 respectively. It is assumed that the phase-shift amounts which are given by the phase-shifters 345 through 348 to the input signals thereof are set as zero. The signals having relative amplitude levels "h" and "i" are transmitted to the outputs of the phase-shifters 345 through 348 without any delay and combined with one another thereat to form a reception beam as shown in FIG. 13(B), in a direction perpendicular to the straight line. By appropriately determining the phase-shift amounts to be given to the signals passing through each phase-shifter, the reception beam formed is directed in a direction from zero to 180 degrees with respect to the straight line.

It should be noted that Langevin-type transducers can also be used in place of the transducers used in the foregoing embodiments, in order to obtain the same results.

It should also be noted that the present invention can be embodied in a beam forming device used in a radar apparatus. It is now assumed that the radiating surface of a radar antenna is shaped in the form of a rectangular parallelpiped. The energy amount of an electromagnetic wave signal produced from each point of the radiating surface of the antenna is determined by the function $y=\sin B/B$. Here, $B=2\pi x\theta_0$; x is the distance between the imaginary midvertical line on the radiating surface and an imaginary vertical line thereon; and $\theta_0$ is the directional angle of a radiation beam formed. As a result, a uniform radiation beam is formed, the directional characteristics of which are shown in FIG. 13(B).

It should be noted that although $\theta_0$ and $\theta_0$ can be practically used as in the foregoing embodiments, it is theoretically more preferable to use $\sin\theta$ and $\sin\theta_0$ in place of $\theta$ and $\theta_0$ respectively, in order to obtain a uniform radiation beam or a uniform reception beam.

It should be noted that electrodes or electrode elements can be formed on both sides of the transducers used in the foregoing embodiments.

While the invention has been described in detail and with reference to specific embodiments thereof, it will be apparent to one skilled in the art that various changes and modifications can be made therein without departing from the spirit and scope of the invention.

What is claimed is:

1. A beam forming device comprising:

(i) a transducer having electrodes for converting electric energy into sound energy, (ii) a vibrating surface on the transducer, and (iii) signal providing means for providing the electrodes with an electric signal so that sound waves are produced from the vibrating surface in a manner that the pressure of a sound wave produced from each point of the surface is dependent on a weight function, thereby forming a uniform radiation beam, (iv) the weight function being a Bessel function expressed as $$y=2Jt(x)/x,$$

wherein, $x=2\pi r/\lambda \sin\theta$ r: the radius of an imaginary circle on the vibrating surface of the transducer, λ: the wavelength of a carrier for carrying a signal applied to the electrodes of the transducer, and θ an azimuthal angle.

2. A beam forming device as defined in claim 1 wherein the transducer is a circular electrostrictive transducer.

3. A beam forming device as defined in claim 2 wherein (i) the transducer has a circular electrode element at its center and at least one ring-like electrode element which is disposed in a concentric relation with the circular electrode element on one side of the transducer, and a circular electrode on the other side of the transducer, and (ii) the signal providing means furnishes the circular electrode element and the ring-like electrode element with corresponding signals the amplitude levels of which are dependent on the Bessel function $y=2J_1(x)/x$, and provides the circular electrode with a signal having a reference amplitude level.

4. A beam forming device as defined in claim 3 wherein the signal providing means comprises a transformer having a primary winding and a secondary winding, with one end of the secondary winding being connected to the circular electrode element and the other end of the secondary winding being connected to the ring-like electrode element and an intermediate tap thereof being connected to the circular electrode and the primary winding being supplied with an electric signal.

5. A beam forming device as defined in claim 2 wherein (i) the transducer has a circular electrode element at its center and a plurality of ring-like electrode elements each of which is disposed in a concentric relation with the circular electrode element, on one side of the transducer, and a circular electrode on the other side of the transducer, and (ii) the signal providing means furnishes the circular electrode element and the plurality of ring-like electrode elements with corresponding signals respectively the amplitude levels of which are dependent on the Bessel function $y=2J_1(x)/x$, and provides the circular electrode with a signal having a reference amplitude level.

6. A beam forming device as defined in claim 5 wherein the signal providing means comprises a transformer having a primary winding and a secondary winding, with an intermediate tap of the secondary winding being connected to the circular electrode on the other side of the transducer and the other taps of the secondary winding being connected to the corresponding electrode elements on the one side of the transducer so that the signals having amplitude levels dependent on the Bessel function are supplied to the electrode elements respectively.

7. A beam forming device as defined in claim 2 wherein (i) the transducer has a circular electrode element at its center and at least one ring-like electrode element which is disposed in a concentric relation with the circular electrode element on one side of the transducer, and a circular electrode on the other side of the transducer, each portion of the transducer between the two electrodes on the respective sides of the transducer being polarized in a direction dependent on the Bessel function $y=2J_1(x)/x$, and (ii) the signal providing means provides the circular electrode element and the ring-like electrode element with corresponding signals the amplitude levels of which are dependent on the Bessel function and provides the circular electrode with a signal having a reference amplitude level.

8. A beam forming device as defined in claim 7 wherein the signal providing means comprises a transformer having a primary winding and a secondary winding, with one end of the secondary winding being connected to the circular electrode element, the other end of the secondary winding being connected to the circular electrode and an intermediate tap thereof being connected to the ring-like electrode element.

9. A beam forming device as defined in claim 2 wherein (i) the transducer has a circular electrode on one side of the transducer and another circular electrode on the other side thereof, and the transducer is polarized in directions and with degrees of polarization which are dependent on the Bessel function, $y=2J_1(x)/x$, and (ii) the sigal providing means furnishes the circular electrodes with an electric signal.

10. A beam forming device as defined in claim 9 wherein the signal providing means comprises a transformer having a primary winding and a secondary winding, with one end of the secondary winding being connected to one of the electrodes and the other end of thereof being connected to the other electrode, and the primary winding being supplied with a signal.

11. A beam forming device as defined in claim 1 wherein (i) the transducer comprises a circular electrostrictive transducer element having a first circular electrode element on one side thereof and a second circular electrode element on the other side thereof, and at least one annular electrostrictive transducer element having a first annular electrode element on one side thereof and a second annular electrode element on the other side thereof, the annular transducer element being disposed in a concentric relation with the circular transducer element, and (ii) the signal providing means provides the first circular electrode element and the first annular electrode element with corresponding signals the amplitude levels of which are dependent on the Bessel function $y=2Jt(x)/x$, and provides the second circular and annular electrode elements with a signal having a reference amplitude level.

12. A beam forming device as defined in claim 1 wherein (i) the transducer comprises a circular electrorestrictive transducer elememt having a first circular electrode element on one side thereof and a second circular electrode element on the other side thereof, and at least one annular electrostrictive transducer element having a first annular electrode element on one side thereof and a second electrode element on the other side thereof, each of the transducer elements being polarized in a direction dependent on the Bessel function $y=2Jt(x)/X$, and the annular transducer element being disposed in a concentric relation with the circular transducer element, and (ii) the signal providing means provides the electrode elements on one side of the circular and the annular transducer elements with corresponding signals, the amplitude levels of which are dependent on the Bessel function, and provides the electrode elements on the other side of the circular and annular transducer elements with a signal having a reference amplitude level.

13. A beam forming device as defined in claim 1 wherein (i) the transducer comprises a circular electrostrictive transducer element having a first circular electrode element on one side thereof and a second circular electrode element on the other side thereof, and at least one annular electrostrictive transducer element having a first annular electrode element on one side thereof and a second annular electrode element on the other side thereof, the annular transducer element being disposed in a concentric relation with the circular transducer element and displaced in its longitudinal direction by $\gamma/2$ with respect thereto, and (ii) the signal providing means furnishes the electrode elements on one side of the circular and the annular transducer elements with corresponding signals the amplitude levels of which are dependent on the Bessel function $y=2Jt(x)/X$, and provides the electrode elements on the other side of the transducer elements with a signal having a reference amplitude level.

14. A beam forming device as defined in claim 1 wherein the transducer comprises a plurality of transducer elements which are arranged on a number of imaginary concentric circles.

15. A beam forming device as defined in claim 14 wherein the transducer element comprises an electrostrictive transducer element.

16. A beam forming device as defined in claim 14 wherein the transducer element comprises a magnetostrictive transducer element.

17. A beam forming device comprising;

(i) a transducer having electrodes for receiving sound energy and converting it into electric energy, (ii) a vibrating surface on the transducer, (iii) signal producing means for producing electric signals based on the received sound energy in a manner that the amplitude level of an electric signal derived from the sound energy received by each point of the vibrating surface is determined based on a weight function, and (iv) means for combining the electric signals with one another so that a uniform reception beam is formed, (v) the weight function being a Bessel function expressed as $$y=2J_1(x)/X$$

wherein, $x=2\pi r/\lambda \sin\theta$ r: the radius of an imaginary circle on the vibrating surface of the transducer, λ: the wavelength of a carrier for carrying a signal received by the transducer, and θ: an azimuthal angle.

18. A beam forming device as defined in claim 17

(i) the transducer is a circular electrostrictive transducer.

19. A beam forming device as defined in claim 18 wherein (i) the transducer has a circular electrode element at its center and at least one ring-like electrode element which is disposed in a concentric relation with the circular electrode element on one side of the transducer, and a circular electrode on the other side of the transducer, and signals the amplitude level of which are dependent on the Bessel function $y=2J_1(x)/x$ and a signal having a reference amplitude level.

20. A beam forming device as defined in claim 19 wherein the signal producing means comprises a transformer having a primary winding and a secondary winding, with one end of the secondary winding being connected to the circular electrode element and the other end of the secondary winding being connected to the ring-like electrode element and an intermediate tap thereof being connected to the circular electrode.

21. A beam forming device as defined in claim 18 wherein (i) the transducer has a circular electrode element at its center and a plurality of ring-like electrode elements each of which is disposed in a concentric relation with the circular electrode element on one side of the transducer, and a circular electrode on the other side of the transducer, and (ii) the signal producing means produces signals based on the sound energy received by the vibrating surface signals, the amplitude levels of which are dependent on the Bessel function and a signal having a reference amplitude level.

22. A beam forming device as defined in claim 21 wherein the signal producing means comprises a transformer having a primary winding and a secondary winding, with an intermediate tap of the secondary winding being connected to the circular electrode on the other side of the transducer and the other taps of the secondary winding being connected to the corresponding electrode elements on the one side of the transducer so that the signals having amplitude levels respectively dependent on the Bessel function and a signal having a reference amplitude level are outputted from the secondary winding.

23. A beam forming device as defined in claim 18 wherein (i) the transducer has a circular electrode element at its center and at least one ring-like electrode element which is disposed in a concentric relation with the circular electrode element on one side of the transducer, and a circular electrode on the other side of the transducer, each portion of the transducer between the two electrodes on the respective sides of the transducer being polarized in a direction dependent on the Bessel function, and (ii) the signal producing means produces signals based on the sound energy received by the vibrating surface signals, the amplitude levels of which are dependent on the Bessel function and a signal having a reference amplitude level.

24. A beam forming device as defined in claim 18 wherein (i) the transducer has a circular electrode on one side of the transducer and another circular electrode on the other side thereof, and the transducer is polarized in directions and with degrees of polarization which are dependent on the Bessel function, and (ii) the signal producing means produces signals based on the sound energy received by the vibrating surface signals the amplitude levels of which are dependent on the Bessel function and a signal having a reference amplitude level.

25. A beam forming device as defined in claim 18 wherein (i) the transducer comprises a circular electrostrictive transducer element having a circular electrode element on one side thereof and another circular electrode element on the other side thereof, and at least one ring-like electrostrictive transducer element having an electrode element on one side thereof, and another electrode element on the other side thereof, the ring-like transducer element being disposed in a concentric relation with the circular transducer element, and (ii) the signal producing means produces signals based on the sound energy received by the vibrating surface signals the amplitude of which are dependent on the Bessel function and a signal having a reference amplitude level.

26. A beam forming device as defined in claim 18 wherein (i) the transducer comprises a circular electrostrictive transducer element having a circular electrode element on one side thereof and another circular electrode element on the other side thereof, and at least one ring-like electrostrictive transducer element having an electrode element on one side thereof, each of the transducer elements being polarized in a direction dependent on the Bessel function, and the ring-like transducer element being disposed in a concentric relation with the circular transducer element, and (ii) the signal producing means produces signals based on the sound energy received by the vibrating surface signals the amplitude levels of which are dependent on the Bessel function and a signal having a reference amplitude level.

27. A beam forming device as defined in claim 18 wherein (i) the transducer comprises a circular electrostrictive transducer element having a circular electrode element on one side thereof and another circular electrode element on the other side thereof, and at least one ring-like electrostrictive transducer element having an electrode element on one side thereof and another electrode element on the other side thereof, the ring-like transducer element being disposed in a concentric relation with the circular transducer element and displaced in its longitudinal direction by λ/2 with respect thereto, and (ii) the signal producing means produces signals based on the sound energy received by the vibrating surface signals the amplitude levels of which are dependent on the Bessel function and a signal having a reference amplitude level.

28. A beam forming device as defined in claim 17 wherein the transducer comprises a plurality of transducer elements which are arranged on a number of imaginary concentric circles.

29. A beam forming device as defined in claim 28 wherein the transducer element comprises an electrostrictive transducer element.

30. A beam forming device as defined in claim 28 wherein the transducer comprises a magnetostrictive transducer element.

31. A beam forming device comprising;

(i) a transducer having electrodes for converting electric energy into sound energy and converting sound energy into electric energy, (ii) a vibrating surface on the transducer, (iii) signal providing means for providing the electrodes with an electric signal so that sound waves are produced from the vibrating surface in a manner that the pressure of a sound wave produced from each point on the surface is dependent on a weight function, thereby forming a uniform radiation beam, (iv) signal producing means for producing electric signals based on the received sound energy in a manner that the amplitude level of an electric signal derived from the sound energy received by each point of the vibrating surface is determined based on a weight function, and (v) means for combining the electric signals with one another so that a uniform reception beam is formed, said weight function being a Bessel function $$y=2J1(x)/X$$

wherein, $x=2\pi r/\lambda \sin \theta$ r: the radius of an imaginary circle o$\theta$the vibrating surface of the transducer, $\lambda$: the wavelength of a carrier for carrying a signal applied to the electrodes of the transducer, and $\theta$ an azimuthal angle.

32. A beam forming device comprising;

(i) a radiator for converting first energy into second energy, (ii) the radiating surface of the radiator is in the form of a rectangular parallelpiped and has the width of 2nl, (iii) energy supply means for furnishing the first energy to said radiator so that the second energy is radiated from the radiating surface in a manner that the amount of the second energy produced from a point on the surface is dependent on a weight function, thereby forming a uniform radiation beam, and (v) the weight function is a function expressed by $y=\sin A/A$ wherein, $A=2\pi x \sin \theta_0$ x: the distance between an imaginary straight midline on the radiating surface of the radiator and an imaginary line parallel to the straight line thereon, and $|X|=\eta l/\lambda$ $\theta_0$: the directional angle of a radiation beam formed, and $\theta_0=\sin^{-1}\lambda/2l$ $\lambda$: the wavelength of a carrier for carrying a signal supplied to the radiator l: the distance between the midline and an imaginary line parallel to the midline, or the distance between two adjacent imaginary lines, with no energy being radiated from the points on the imaginary lines n: an integer larger than one.

33. A beam forming device comprising (i) a transducer having electrodes for converting electric energy into sound energy, (ii) a vibrating surface on the transducer, and (iii) signal providing means for providing the electrodes with an electric signal so that sound waves are produced from the vibrating surface in a manner that pressure of a sound wave produced from each point of the surface is dependent on a weight function, thereby forming a uniform radiation beam, wherein (iv) the transducer is in the form of a rectangular parallelpiped and has a vibrating surface having the width of 2 $\eta$l, and (v) the weight function is a function expressed as $$y=\sin A/A,$$

wherein, $A=2\pi x \sin \theta_0$ x: the distance between an imaginary straight midline on the vibrating surface of the transducer and an imaginary line parallel to the straight line thereon, $|x| \leqq n\, l/\lambda$ $\theta_0$: the directional angle of a radiation beam formed, and $\theta_0=\sin^{-1}\lambda/2l$ $\lambda$: the wavelength of a carrier for carrying a signal applied to the electrodes of the transducer, l: the distance between the midline and an imaginary line parallel to the midline, the points on the imaginary line being vibrated at zero strength, or the distance between two adjacent imaginary lines the points on which are vibrated at zero strength, n: an integer larger than one.

34. A beam forming device as defined in claim 33 wherein (i) the transducer has an inner rectangular electrode element and at least one rectangular èlectrode element on both sides of the inner electrode element arranged on one side of the transducer, and a rectangular electrode on the other side of the transducer, and (ii) the signal providing means furnishes the electrode elements with corresponding signals the amplitude levels of which are dependent on the function $y=\sin A/A$, and provides the rectangular electrode with a signal having a reference amplitude level.

35. A beam forming device as defined in claim 34 wherein the signal providing means comprises a transformer having a primary winding and a secondary winding, with one end of the secondary winding being connected to the inner electrode element and the other end of the secondary winding being connected to the outer electrode elements and an intermediate tap thereof being connected to the rectangular electrode and the primary winding being supplied with an electric signal.

36. A beam forming device as defined in claim 33 wherein (i) the transducer has a plurality of rectangular electrode elements on one side thereof and a rectangular electrode on the other side thereof, and (ii) the signal providing means provides the electrode elements with respective signals the amplitude levels of which are dependent on the function, and provides the rectangular electrode with a signal having the reference amplitude level.

37. A beam forming device as defined in claim 36 wherein the signal providing means comprises a transformer.

38. A beam forming device as defined in claim 33 wherein (i) the transducer has an inner rectangular electrode element and at least one outer rectangular electrode element on both sides of the inner electrode element arranged on one side of the transducer, and a rectangular electrode on the other side thereof, each portion of the transducer between each electrode element and the electrode on the respective sides of the transducer being polarized in a direction determined based on the function, and (ii) the signal providing means provides the electrode elements with corresponding signals the amplitude levels of which are dependent on the function, and provides the rectangular electrode with a signal having a reference amplitude level.

39. A beam forming device as defined in claim 33 wherein (i) the transducer has rectangular electrodes on both sides thereof, and the transducer is polarized in directions and with degrees of polarization which are dependent on the function, and (ii) the signal providing means provides the electrodes with an electric signal.

40. A beam forming device comprising (i) a transducer having electrodes for receiving sound energy and converting it into electric energy, (ii) a vibrating surface on the transducer, (iii) signal producing means for producing electric signals based on received sound energy in a manner that an electric signal derived from sound energy received by each point of the vibrating surface has an amplitude that is dependent on a weight function, and (iv) means for combining the electric signals so that a uniform reception beam is formed, wherein (v) the transducer is in the form of a rectangular parallelpiped and has a vibrating surface having a width of $2\eta\rho l$, and (vi) the weight function is a function expressed as $$y = \sin A/A$$

wherein $A = 2\pi x \sin \theta_0$ x: the distance between an imaginary straight midline on the transducer and an imaginary line parallel to the straight line thereon, and $|x| = n\, l/\lambda$, $\theta_0$: the directional angle of a reception beam formed, and $\theta_0 = \sin^{-1}\lambda/2l$, λ: the wavelength of a carrier for carrying an incoming signal received by the transducer, l: the distance between the midline and an imaginary line parallel to the midline, from the points on the imaginary line derived signals having a zero amplitude level, or the distance between two adjacent imaginary lines, from the points on these lines derived signals having a zero amplitude level, n: an integer larger than one.

41. A beam forming device as defined in claim 40 wherein (i) the transducer has an inner rectangular electrode element and at least one outer rectangular electrode element on both sides of the inner electrode element arranged on one side of the transducer, and a rectangular electrode on the other side thereof, and (ii) the signal producing means produces signals based on the sound energy received by the vibrating surface, the amplitude levels of which are dependent on the function and a signal having a reference amplitude level.

42. A beam forming device as defined in claim 41 wherein the signal producing means comprises a transformer having a primary winding and a secondary winding, with one end of the secondary winding being connected to the inner electrode element and the other end of the secondary winding being connected to the outer electrode elements and an intermediate tap thereof being connected to the rectangular electrode.

43. A beam forming device as defined in claim 40 wherein (i) the transducer has a plurality of rectangular electrode elements on one side thereof and a rectangular electrode on the other side thereof, and (ii) the signal producing means produces signals based on the sound energy received by the vibrating surface, the amplitude levels of which are dependent on the function and a signal having a reference amplitude level.

44. A beam forming device as defined in claim 43 wherein the signal producing means comprises a transformer.

45. A beam forming device as defined in claim 40 wherein (i) the transducer has an inner rectangular electrode element and at least one outer rectangular electrode element on both sides of the inner electrode element arranged on one side of the transducer, and a rectangular electrode on the other side thereof, each portion of the transducer between the each electrode element and the electrode on the respective sides of the transducer being polarized in a direction dependent on the function, and (ii) the signal producing means produces signals based on the sound energy received by the vibrating surface, the amplitude levels of which are dependent on the function and a signal having a reference amplitude level.

46. A beam forming device as defined in claim 40 wherein (i) the transducer has rectangular electrodes on both sides thereof, and the transducer is polarized in directions and with degrees of polarization which are dependent on the function, and (ii) the signal producing means produces signals based on the sound energy received by the vibrating surface, the amplitude levels of which are dependent on the function and a signal having a reference amplitude level.

47. A beam forming device comprising (i) a transducer having electrodes for converting electric energy into sound energy and converting sound energy into electric energy, (ii) a vibrating surface on the transducer, (iii) signal providing means for providing the electrodes with an electric signal so that sound waves are produced from the vibrating surface in a manner that pressure of a sound wave produced from each point on the surface is dependent on a weight function, thereby forming a uniform radiation beam, (iv) signal producing means for producing electric signals based on received sound energy in a manner that an electric signal derived from the sound energy received by each point of the vibrating surface has an amplitude level that is dependent on a weight function, and (v) means for combining the electric signals with one another so that a uniform reception beam is formed, wherein (vi) the transducer is in the form of a rectangular parallelpiped, and (vii) the weight function is the function $$y=\sin A/A$$

wherein $A=2\pi x \sin \theta_0$ x: the distance between an imaginary straight midline on the transducer and an imaginary line parallel to the straight line thereon, and $|x|=n\ l/\lambda$ $\theta_0$: the directional angle of a reception beam formed, and $\theta_0=\sin^{-1}\lambda/2l$ λ: the wavelength of a carrier for carrying an incoming signal received by the transducer l: the distance between the midline and an imaginary line parallel to the midline, from the points on the imaginary line derived signals having a zero amplitude level, or the distance between two adjacent imaginary lines, from the points on these lines derived signals having a zero amplitude level n: an integer larger than one.

48. A beam forming device comprising (i) a transducer having electrodes for converting electric energy into sound energy, (ii) a vibrating surface on the transducer, and (iii) signal providing means for providing the electrodes with an electric signal so that sound waves are produced from the vibrating surface in a manner that pressure of a sound wave produced from each point of the surface is dependent on a weight function, thereby forming a uniform radiation beam, wherein (iv) the transducer is in a cylindrical form and has a vibrating surface having the width of 2l, and (v) the weight function is a function expressed as $$y=\sin A/A,$$

wherein, $A=2\pi x \sin \theta_0$ x: the distance between an imaginary circular midline on the vibrating surface of the transducer and an imaginary circular line thereon parallel to the midline, $|x|\leqq n\ l/\lambda$, $\theta_0$: the directional angle of a radiation beam formed, and $\theta_0=\sin^{-1}\lambda/2l$ λ: the wavelength of a carrier for carrying a signal applied to the electrodes of the transducer, l: the distance between the circular midline and an imaginary circular line, the points on the imaginary circular line being vibrated at zero strength, or the distance between two adjacent imaginary circular lines the points on which are vibrated at zero strength n: an integer larger than one.

49. A beam forming device as defined in claim 48 wherein (i) the transducer device has a central ring-like electrode element having the width of 2 l and at least one ring-like electrode element having the width of l on both sides of the central electrode element arranged on one side of the transducer, and a circular electrode on the other side of the transducer, and (ii) the signal providing means furnishes the electrode elements with corresponding signals respectively, the amplitude levels of which are dependent on the function $y=\sin A/A$.

50. A beam forming device as defined in claim 49 wherein the signal providing means comprises a transformer having a primary winding and a secondary winding, with one end of the secondary winding being connected to the central electrode element and the other end thereof being connected to the side electrode elements and an intermediate tap thereof being connected to the circular electrode and the primary winding being supplied with an electric signal.

51. A beam forming device comprising (i) a transducer having electrodes for receiving sound energy and converting it into electric energy, (ii) a vibrating surface on the transducer, (iii) signal producing means for producing electric signals based on the received sound energy in a manner that an electric signal derived from the sound energy received by each point of the vibrating surface has an amplitude level dependent on a weight function, and (iv) means for combining the electric signals with one another so that a uniform receptionbeam is formed, wherein (v) the transducer is in a cylindrical form and has a vibrating surface having the width of $2\eta l$, and (vi) the weight function is a function expressed as $$y=\sin A/A$$

wherein, $A=2\pi\sin \theta_0$ x: the distance between an imaginary circular midline on the vibrating surface of the transducer and an imaginary circular line thereon parallel to the midline, and $|x|\leqq n\ l/\lambda$.

$\theta_0$: the directional angle of a reception beam formed, and $\theta_0=\sin^{-1}\lambda/2l$ λ: the wavelength of a carrier for carrying an incoming signal received by the transducer l: the distance between the circular midline and an imaginary circular line, from the points on the imaginary circular line derived signals having a zero amplitude level, or the distance between two adjacent imaginary lines, from the points on these lines derived signals having a zero amplitude level n: an integer larger than one.

52. A beam forming device comprising (i) a transducer having electrodes for converting electric energy into sound energy and converting sound energy into electric energy, (ii) a vibrating surface on the transducer, (iii) signal providing means for providing the electrodes with an electric signal so that sound waves are produced from the vibrating surface in a manner that pressure of a sound wave produced from each point on the surface is dependent on a weight function, thereby forming a uniform radiation beam, (iv) signal producing means for producing electric signals based on the received sound energy in a manner that an electric signal derived from the sound energy received by each point of the vibrating surface has an amplitude level dependent on a weight function, and (v) means for combining the electric signals so that a uniform reception beam is formed, wherein the weight function is the function $$y=\sin A/A$$

wherein $A=2\pi x \sin\theta_0$ x: the distance between an imaginary straight midline on the transducer and an imaginary line parallel to the straight line thereon, and $|x|=n\ l/\lambda$ $\theta_0$: the directional angle of a reception beam formed, and $\theta_0=\sin^{-1}\lambda/2l$ λ: the wavelength of a carrier for carrying an incoming signal received by the transducer l: the distance between the midline and an imaginary line parallel to the midline, from the points on the imaginary line derived signals having a zero amplitude level, or the distance between two adjacent imaginary lines, from the points on these lines derived signals having a zero amplitude level n: an integer larger than one.

53. A beam forming device comprising (i) a transducer having electrodes for converting electric energy into sound energy, (ii) a vibrating surface on the transducer, and (iii) signal providing means for providing the electrodes with an electric signal so that sound waves are produced from the vibrating surface in a manner that pressure of a sound wave produced from each point of the surface is dependent on a weight function, thereby forming a uniform radiation beam, wherein (iv) the transducer comprises a least three independent transducer elements arranged on an imaginary straight line and spaced at equal distances l therebetween, and (v) the weight function is a function expressed as $$y=\sin A/A,$$

wherein, $A=2\pi x \sin\theta_0$ $|x|\leqq n\ l/\lambda$ $\theta_0$: the directional angle of a radiation beam formed, and $\theta_0=\sin^{-1}\lambda/2l$ λ: the wavelength of a carrier for carrying a signal applied to the electrodes of the transducer elements.

n: an integer.

54. A beam forming device as defined in claim 53 wherein the signal providing means comprises phase-shifters, each connected to one of the corresponding independent transducer elements and shifts in phase a signal to be supplied to the transducer element by an amount dependent on the pointing direction of a radiation beam formed.

55. A beam forming device comprising (i) a transducer having electrodes for receiving sound energy and converting it into electric energy, (ii) a vibrating surface on the transducer, (iii) signal producing means for producing electric signals based on received sound energy in a manner that an electric signal derived from sound energy received by each point of the vibrating surface has an amplitude level dependent on a weight function, and (iv) means for combining the electric signals so that a uniform reception beam is formed, wherein (v) the transducer comprises at least three independent transducer elements disposed on an imaginary straight line and spaced at equal distances l therebetween, and (vi) the weight function is a function expressed as $$y=\sin A/A,$$

wherein, $A=2\pi x \sin\theta_0$ $|x|\leqq n\ l/\lambda$ $\theta_0$: the directional angle of a reception beam formed, and $\theta_0=\sin^{-1}\lambda/2l$ λ: the wavelength of a carrier for carrying a signal received by the transducer elements n: an integer.

56. A beam forming device as defined in claim 55 wherein the signal producing means comprises phase-shifters, each connected to a separate one of the corresponding independent transducer elements for shifting in phase the signal from the transducer element by an amount dependent on the pointing direction of a reception beam formed.

57. A beam forming device comprising;

(i) a transducer having electrodes and a vibrating surface, for converting electric energy into sound energy, (ii) first signal providing means for providing the electrodes with an electric signal so that sound waves are produced from the vibrating surface in a manner that pressure of a sound wave produced from each point of the surface is based on a first weight function, thereby forming a first uniform radiation beam, (iii) second signal providing means for providing the electrodes with an electric signal so that sound waves are produced from the vibrating surface in a manner that the pressure of a sound wave produced from each point of the surface is based on a second weight function, thereby forming a second uniform radiation beam, and (iv) selecting means for selecting the first or the second signal providing means to supply the transducer with the electric signal.

58. A beam forming device comprising;

(i) a transducer having electrodes and a vibrating surface, for receiving sound energy and converting it into electric energy, (ii) first signal producing means for generating electric signals based on the received sound energy in a manner that an electric signal derived from the sound energy received by each point of the vibrating surface has an amplitude level dependent on a first weight function (iii) first combining means for combining the electric signals from the first signal producing means so that a first uniform reception beam is formed, (iv) second signal producing means for generating electric signals based on the received sound energy in a manner that the amplitude level of an electric signal derived from the sound energy received by each point of the vibrating surface is dependent on a second weight function, (v) second combining means for combining the electric signals from the second signal producing means with one another so that a second uniform reception beam is formed, and (vi) selecting means for outputting the signals from the first or the second combining means.

59. A beam forming device as defined in claim 33, wherein $\theta_0$ is used in place of sin $\theta_0$.

60. A beam forming device as defined in claim 2 wherein $\theta$ is used in place of sin $\theta$.

* * * * *